United States Patent
Sacristan

Patent Number: 6,076,351
Date of Patent: Jun. 20, 2000

[54] POWER BRAKING SYSTEM WITH IMPROVED HYDRAULIC REACTION

[75] Inventor: Fernando Sacristan, Drancy, France

[73] Assignee: Bosch Systemes de Freinage, Drancy, France

[21] Appl. No.: 08/913,574

[22] PCT Filed: Aug. 27, 1997

[86] PCT No.: PCT/FR97/01527

§ 371 Date: Sep. 3, 1997

§ 102(e) Date: Sep. 3, 1997

[87] PCT Pub. No.: WO98/22321

PCT Pub. Date: May 28, 1998

[30] Foreign Application Priority Data

Nov. 19, 1996 [FR] France ................... 96 14032

[51] Int. Cl.$^7$ ................................................. B60T 13/20
[52] U.S. Cl. ................................................. 60/553; 91/371
[58] Field of Search ............... 60/553, 552; 91/370, 91/371

[56] References Cited

U.S. PATENT DOCUMENTS 3,470,695  10/1969  Kilb ................................ 60/549
3,910,046  10/1975  Gardner et al. ................... 60/553

*Primary Examiner*—Edward K. Look
*Assistant Examiner*—Thomas E. Lazo
*Attorney, Agent, or Firm*—Leo H. McCormick, Jr.; Warren Comstock

[57] ABSTRACT

A boosted braking system for a motor vehicle having a master cylinder (200) equipped with a main hydraulic piston (30) for causing an increase in pressure ($P_1$) of brake fluid and a pneumatic booster (22) which is controlled by the application of an input force ($F_2$) to a control rod (26). The control rod (26) being integral with a plunger (28) which controls the opening of a three-way valve (24). The booster (22) having a rigid casing (10) which is divided in a leaktight fashion into at least first (12) and second (14) chambers by at least one moving partition (16). The moving partition (16) being acted on by a difference in pressure between the first (12) and second (14) chamber on the opening of the three-way valve (24). The moving partition (16) driving a pneumatic piston (22) which carries the three-way valve (24) and contributing to at least in transmitting a boost force ($F_1$) to the main hydraulic piston (30) of the master cylinder (200). The main hydraulic piston (30) includes a hollow moving cylinder (32). A reaction piston (34) which slides in a leaktight and axial direction inside of said hollow moving cylinder (32). The reaction piston (34) being integral with the plunger (28) and delimits within the hollow cylinder (32) a reaction chamber (36). The reaction chamber (36) being in communication with an interior volume (V) of the master cylinder (200) through a pressure-regulating device (50,64) to provide a pressure for the reaction piston (34) to counter the input force ($F_2$).

10 Claims, 1 Drawing Sheet

POWER BRAKING SYSTEM WITH IMPROVED HYDRAULIC REACTION

The present invention relates to boosted braking systems for motor vehicles, comprising a master cylinder controlling the hydraulic pressure in the brake circuit connected to the brakes of the vehicle, it being possible for this master cylinder to be actuated by a pneumatic booster when the driver of the vehicle depresses the brake pedal, the reaction force being transmitted hydraulically to this pedal.

BACKGROUND OF THE INVENTION

In the conventional way, the master cylinder is full of brake fluid and equipped with a main hydraulic piston intended to receive an actuating force composed of an input force and of a boost force both acting in an axial direction.

Also, the pneumatic booster can be controlled by the application of the input force to a control rod controlling the opening of a valve by means of a plunger in order to exert the actuating force on the main hydraulic piston of the master cylinder, the booster including a rigid casing divided in leaktight fashion into two chambers by means of a moving partition which can be acted upon by a difference in pressure between the two chambers resulting from the opening of the valve and can drive a pneumatic piston, which can move with respect to the casing, carrying the valve, and contributing at least to transmitting the boost force.

In braking systems with hydraulic reaction, the main hydraulic piston of the master cylinder itself includes a hollow moving cylinder communicating with the master cylinder and receiving at least some of the boost force, and inside which there slides, in leaktight fashion and in the axial direction, a reaction piston which can receive at least the input force, at least one opening being made in the moving cylinder to make the inside of the latter communicate with the inside of the master cylinder.

Such a device is described, for example, in document EP-B-0,443,886.

These devices with hydraulic reaction have as their advantages optimum control of the pressure of the brake fluid by the force exerted on the brake pedal and a characteristic operating curve giving the pressure prevailing in the master cylinder as a function of the input force exerted on the brake pedal, which is constant irrespective of the conditions of operation.

However, they have the drawback that when the reaction piston comes into contact with the plunger in order to transmit the reaction force to it, this contact is somewhat abrupt depending on the rate of application of the input force, and is transmitted to the control rod integral with the plunger and to the brake pedal articulated to the control rod and is felt as a rather unpleasant sensation by the driver of the vehicle. What is more, these impacts between the plunger and the reaction piston may damage the plunger and/or the reaction piston and detract from the correct operation of the braking system, or in any case reduce its life.

SUMMARY OF THE INVENTION

The present invention falls within this context and its object is to propose a boosted braking system in which the sensation felt by the driver when he depresses the brake pedal is improved, it furthermore being necessary for such a braking system to be of low cost while having an operation which is reliable under all circumstances.

To this end, the present invention proposes a boosted braking system for a motor vehicle, comprising on the one hand a master cylinder full of brake fluid and equipped with a main hydraulic piston intended to receive an actuating force composed of an input force and of a boost force both acting in an axial direction, so as to cause an increase in pressure in the brake fluid and on the other hand a pneumatic booster which can be controlled by the application of the input force to a control rod integral with a plunger controlling the opening of a three-way valve in order to exert the actuating force on the main hydraulic piston, the booster including a rigid casing divided in leaktight fashion into at least two chambers by means of at least one moving partition which can be acted upon by a difference in pressure between the two chambers resulting from the opening of the three-way valve and can drive a pneumatic piston, which can move with respect to the casing, carrying the three-way valve and contributing at least to transmitting the boost force, the main hydraulic piston of the master cylinder itself including a hollow moving cylinder receiving at least some of the boost force, and inside which there slides, in leaktight fashion and in the axial direction, a reaction piston which can receive at least the input force.

Such a boosted braking device is known, for example, from the aforementioned document.

According to the present invention, the reaction piston is integral with the plunger and delimits within the moving cylinder a reaction chamber communicating with the interior volume of the master cylinder via a pressure-regulating device.

Thanks to this arrangement, the variation in reaction force is continuous and results from the variation of a physical parameter, namely the hydraulic pressure prevailing in the reaction chamber, and is not discontinuous, as it was in the aforementioned document, where it resulted from a piston subjected to the pressure prevailing in the master cylinder coming into abutment on the plunger.

Advantageously, the pressure-regulating device introduces a constant difference between the pressure prevailing in the interior volume of the master cylinder and the pressure prevailing in the reaction chamber.

According to an advantageous embodiment, the pressure-regulating device includes a floating piston urged forwards by first elastic means, able to move between a first stop and a second stop, and including a normally closed non-return valve allowing communication between the reaction chamber and the interior volume of the master cylinder and preventing communication in the other direction, the non-return valve being opened when the floating piston is shifted backwards under the effect of a pressure in the interior volume of the master cylinder which exceeds a predetermined value.

Further objects, features and advantages of the invention will emerge clearly from the description which follows of embodiments given by way of non-limiting example with reference to the appended drawings.

DETAILED DESCRIPTION OF THE INVENTION

Insofar as the invention relates only to an improvement made to pneumatically boosted braking systems, and as the overall construction and operation of such systems are well known to those skilled in the art, these systems will be summarized rapidly here merely to give a complete understanding of the improvement that the invention represents.

Schematically, a system of this type comprises a booster 100 and a master cylinder 200 intended to activate brake motors (not represented).

The booster 100 is designed to be fixed in the customary fashion on a bulkhead (not represented) separating the engine bay of a vehicle from the passenger compartment of this vehicle and to be actuated by a brake pedal P situated in this passenger compartment. The master cylinder 200 controlling the hydraulic braking circuit of the vehicle is fixed on the front wall of the booster 100.

Figure 1:
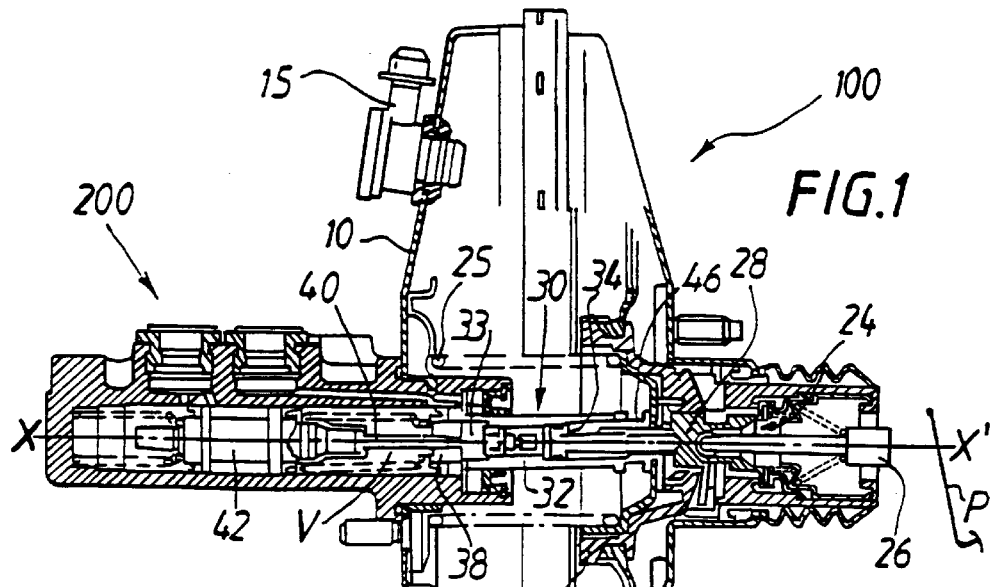
FIG. 1 represents a view in section of a boosted braking system produced in accordance with the present invention.
Figure 2:
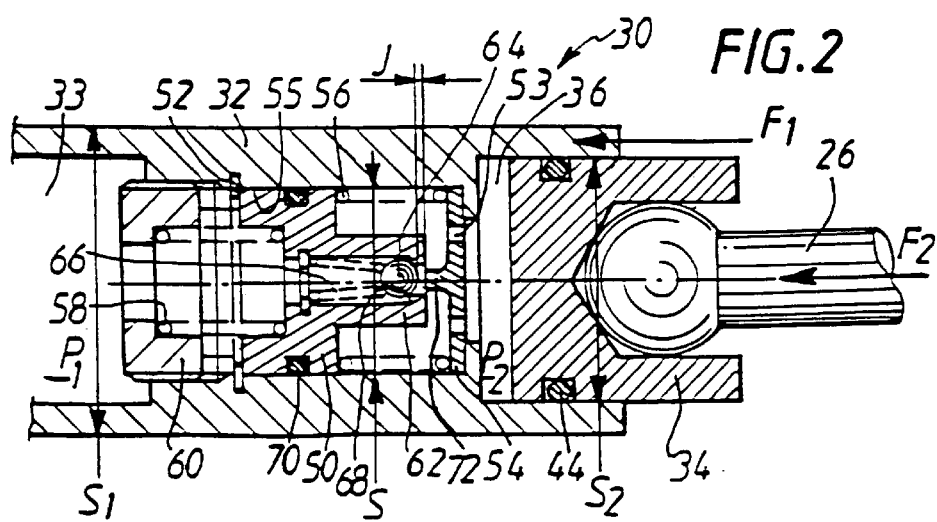
FIG. 2 represents a view in section on an enlarged scale of the central part of the device of FIG. 1.

By convention, that part of the booster/master cylinder assembly which points towards the master cylinder 200 is called the "front", and that part of this assembly which points towards the brake pedal 12 [sic] is called the "rear". In FIGS. 1 and 2, the front is therefore to the left and the rear to the right.

The booster 100 itself includes a rigid casing 10, the interior volume of which is divided into a front chamber 12 and a rear chamber 14, in leaktight fashion, by a moving partition 16 comprising a membrane 18 and a rigid skirt 20 and capable of driving a pneumatic piston 22 which can move inside the casing 10.

The front chamber 12, the front face of which is closed in leaktight fashion by the master cylinder 200, is permanently connected to a source of partial vacuum through a connection 15. The pressure in the rear chamber 14 is controlled by a three-way valve 24 controlled by a control rod 26 connected to the brake pedal P and integral with a plunger 28.

When the control rod 26 is in the position of rest, that is to say pulled towards the right, the valve 24 establishes a communication between the two chambers 12 and 14 of the booster. As the rear chamber 14 is then subjected to the same partial vacuum as the front chamber 12, the piston 22 is pushed back towards the right, in the position of rest, by a spring 25.

Actuating the control rod 26 towards the left has the effect, first of all, of shifting the valve 24 so that it isolates the chambers 12 and 14 from one another, and then, secondly, of shifting this valve in such a way that it opens the rear chamber 14 to atmospheric pressure.

The difference in pressure between the two chambers 12 and 14, which is now felt by the membrane 18, exerts on the moving partition 16 a thrust which tends to shift it to the left and allow it to drive the piston 22, which in turn shifts, compressing the spring 25.

The brake boosting force $F_1$ or "boost force" resulting from the thrust of the moving partition 16, and the brake force $F_2$ exerted on the control rod 26, or "input force" are then applied together in the direction of the axis X–X' of the booster 100 in the direction of the master cylinder 200, and combine to constitute the actuating force thereof.

More specifically, the boost force $F_1$ is applied to the main hydraulic piston 30 of the master cylinder and causes it to shift to the left (in FIGS. 1 and 2), which leads to a rise in pressure of the brake fluid present in the interior volume V of the master cylinder 200 and an actuation of the brake motors connected thereto, as is well known in the technical field of braking.

As seen more clearly in FIG. 2, the main hydraulic piston 30 is in fact composite and comprises on the one hand a moving and hollow cylinder 32, and on the other hand a reaction piston 34, sliding in leaktight fashion inside the moving cylinder 32. The reaction piston 34 is integral with the plunger 28 as has been represented in FIG. 1, or consists of the plunger itself as has been represented in FIG. 2.

The interior volume 33 of the hollow moving cylinder 32 communicates with the interior volume V of the master cylinder 200 via openings made in a wall 38 (FIG. 1) to which there may be fixed a device 40 for adjusting the separation between the moving cylinder 32, which constitutes the primary piston of the master cylinder, and the secondary piston 42 of the master cylinder.

The reaction piston 34 can slide in leaktight fashion inside the moving cylinder 32 thanks to an annular seal 44 for delimiting a reaction chamber 36 inside the moving cylinder 32. Furthermore, as the reaction piston 34 is integral with the plunger 28, itself integral with the control rod 26, the reaction piston 34 receives at least the input force $F_2$ exerted on the control rod 26, as has been represented diagrammatically in FIG. 2.

The moving cylinder 32 is connected, via a ring 46, to the rigid skirt 20 in such a way as to receive at least some of the boost force $F_1$ exerted by this rigid skirt 20.

A floating piston 50 is arranged inside the moving cylinder 32, in such a way that it can be shifted between a first stop 52 formed, for example, by a circlip, and a second stop 54 which will be explained later. The floating piston 50 is urged forwards by a first spring 56 resting against a shoulder of the moving cylinder 32 or, as has been represented, on the stop 54, and backwards by a second spring 58 resting on a stop 60 integral with the moving cylinder 32.

The preload at rest $R_1$ of the first spring 56 is greater than the preload at rest $R_2$ of the second spring 58, which means that at rest the floating piston rests on the first stop 52.

The floating piston 50 is hollow and inside it includes a non-return valve 62 formed, in the example represented, by a ball valve, of which the ball 64 is urged by a spring 66 in the direction of a seat 68 of the floating piston 50. The second stop 54 is formed with openings 53 allowing brake fluid to pass freely on each side of this stop 54, and with a central pip 72 capable of interacting with the ball 64 in order to lift it off its seat 68 when the floating piston 50 is shifted backwards, there being a clearance J at rest between the ball 64 and the front end of the pip 72. Finally, the floating piston 50 slides in leaktight fashion thanks to an annular seal 70 in a bore 55 of cross-sectional area S of the moving cylinder 32.

The operation of the boosted braking system described hitherto will now be explained.

At rest, the various moving parts occupy the position represented in FIGS. 1 and 2, and in particular, the floating piston 50 is in abutment towards the front on the stop 52 of the moving cylinder 32 under the effect of the action of the spring 56, less that of the spring 58, and the non-return valve 62 is closed. Furthermore, the valve 24 allows communication between the two chambers 12 and 14, which are therefore at the same reduced pressure.

An initial force on the brake pedal serves to overcome the preload of the spring of the control rod 26 and to bring the valve 24 into a position in which it isolates the two chambers 12 and 14 from one another. This increase in force on the brake pedal therefore provides no increase in pressure in the master cylinder, and corresponds to what has become known as the dead travel of the boosted braking system. It is represented on the curve of FIG. 3 by the segment OA. Adjusting the preload at rest of the spring of the control rod 26 makes it possible to set the dead travel, and therefore the length of the segment OA, to any desired value.

After the control rod 26 has travelled this predetermined distance, the valve 24 opens the rear chamber 14 to the atmosphere, and a pressure difference is set up between the two chambers 12 and 14 of the booster. This pressure difference causes a boost force $F_1$ which makes the rigid skirt 20 and the moving cylinder 32 advance.

The hydraulic pressure $P_1$ in the internal volume V of the master cylinder 200 then rises and is transmitted, by pipes (not represented) to the brakes of the vehicle. This pressure $P_1$ is also transmitted to the interior volume 33 of the moving cylinder 32 and is exerted on the cross-sectional area S of the floating piston 50.

First of all, the force generated by this pressure $P_1$ being exerted on this-cross-sectional area S does not exceed the preload R to which the floating piston is subjected, that is to say the difference $R=(R_1-R_2)$ between the preloads at rest of the springs 56 and 58, which means that the floating piston 50 remains immobile with respect to the moving cylinder 32, and that pressure $P_2$ in the reaction chamber 36 remains unchanged because the ball 64 stays resting against its seat 68. No reaction is therefore felt on the brake pedal. This first phase of operation is represented by the segment AB of the curve in FIG. 3, where there is an increase in pressure $P_1$ in the master cylinder 200 and in the brakes without any variation in input force. The length of the segment AB is called the "jump" of the booster.

The booster jump may be set to any desired value by adjusting the preload at rest to which the floating piston 50 is subjected. For example, and as has been represented in FIG. 2, provision may be made for the stop 60 to be threaded and screwed into a tapping made in the moving cylinder 32.

Screwing or unscrewing the stop 60 in the moving cylinder 32 thus has the effect of compressing or of relaxing the spring 58 and therefore of increasing or reducing the preload $R_2$ that this spring exerts on the floating piston 50, that is to say of reducing or of increasing the value of the jump.

In a second phase of operation, the hydraulic pressure $P_1$ in the volume 33 increases and reaches a predetermined value for which, when applied to the cross-sectional area S of the floating piston 50, it becomes sufficient to overcome the preload R. The floating piston 50 therefore shifts backwards. It 30 shifts first of all by an amount J, for which the ball 64 comes to rest against the pip 72, as illustrated by the point B of the curve of FIG. 3.

An additional increase in the pressure $P_1$ causes an additional backwards shifting of the floating piston 50, with the result that the ball 64 is lifted off its seat 68, and that the volume 33 is made to communicate with the reaction chamber 36. The pressure $P_2$ in the reaction chamber 36 therefore rises and is exerted on the cross-sectional area $S_2$ of the reaction piston 34 which is then subjected to a reaction force, directed backwards, and transmitted to the brake pedal via the control rod 26.

The variation in the reaction force resulting from this rise in pressure in the reaction chamber 36 is rapid and continuous because it corresponds to the change in a physical parameter, namely the hydraulic pressure prevailing in the reaction chamber 36. It is not abrupt, like in the aforementioned document, where it resulted from a piston subjected to the pressure prevailing in the master cylinder coming to rest against the plunger.

This thus results in a better sensation felt by the driver on the brake pedal, this sensation being comparable with that afforded by boosters equipped with a reaction disc made of elastomeric material.

The reaction piston 34 is then subjected, on its cross-sectional area $S_2$, to the hydraulic pressure $P_2$ prevailing in the reaction chamber 36, this pressure $P_2$ being a function of the pressure $P_1$ prevailing in the volume 33 and in the volume V of the master cylinder, and equal to:

$$P_2 = P_1 - \frac{R}{S} = P_1 - \frac{R_1 - R_2}{S},$$

The magnitude $$\frac{R_1 - R_2}{S}$$

being a constant fixed by construction.

The floating piston 50, subjected to the preload R, including the valve with ball 64 capable of interacting with the pip 72, thus constitutes a pressure-regulating device, introducing a constant difference between the pressure $P_1$ prevailing in the interior volume V of the master cylinder 200 and the pressure $P_2$ prevailing in the reaction chamber 36.

Figure 3:
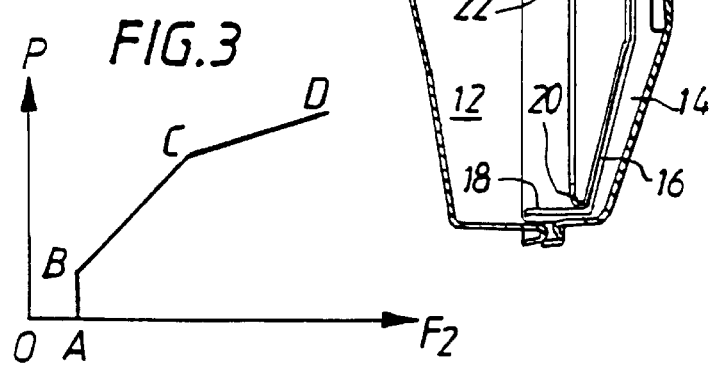
FIG. 3 represents the characteristic operating curve of the boosted braking system in accordance with the present invention, and represents the variations in the pressure generated by the master cylinder as a function of the force applied to the brake pedal.

This then results in a reaction force on the reaction piston 34, this force opposing the input force $F_1$ and therefore making it possible to control the hydraulic pressure in the master cylinder and in the brakes of the vehicle, as has been represented by the segment BC in the curve of FIG. 3.

The slope of this segment BC represents the boost ratio of the braking system. This boost ratio is also equal to the ratio of the cross-sectional area $S_1$ of the moving cylinder 32 to the cross-sectional area $S_2$ of the reaction piston 34.

The boost force reaches its maximum when the pressure in the rear chamber 14 of the booster reaches atmospheric pressure, and can therefore increase no further. The phenomenon known by the name of saturation and represented by point C on the curve of FIG. 3 is then reached.

Beyond the point C, namely on the segment CD, the boost force $F_1$ remains constant and any increase in deceleration of the vehicle is obtained by a corresponding increase in the input force $F_2$.

The operation of the braking system that has just been described is reproduced upon each braking action, irrespective of the rate of application of input force to the control rod 26.

When the driver releases his force, the re-established communication via the valve 24 between the front and rear chambers has the effect of making the moving partition 16 and the moving cylinder 32 move back under the effect of the spring 25 and of making the pressure $P_1$ in the interior volume V of the master cylinder drop.

The floating piston 50 can therefore come back to rest on the stop 52 under the action of the spring 56 less that of the spring 58, and the pressure $P_2$ in the reaction chamber 36 can drop via the valve with ball 64, allowing fluid to circulate from the reaction chamber 36 towards the interior volume 33 of the moving cylinder 32 and towards the interior volume V of the master cylinder. The various moving parts then return to their position of rest illustrated in FIGS. 1 and 2.

Thus, according to the present invention a boosted braking system with hydraulic reaction has indeed been achieved which exhibits improved operating characteristics because it allows the driver of the vehicle to control very accurately the pressure of the braking fluid, without feeling any impact on the brake pedal. The means used to obtain this result are relatively simple, and are therefore of low cost and operate reliably under all circumstances.

Of course, the present invention can include numerous alternative forms which will be clear to those skilled in the art and which fall within the scope of the present invention. Thus, for example, the invention could be applied with equal ease either to single boosters, as has been represented, or to boosters mounted in tandem.

What is claimed is:

1. A boosted braking system for a motor vehicle having a master cylinder full of brake fluid and equipped with a main hydraulic piston which receives an actuating force composed of an input force and of a boost force both acting in an axial direction to cause an increase in pressure in said brake fluid and a pneumatic booster controlled by the application of said input force to a control rod integral with a plunger which controls the opening of a three-way valve to exert said actuating force on said main hydraulic piston, said booster including a rigid casing divided in leaktight fashion into at least a first chamber and a second chamber by means of at least one moving partition, said moving partition being acted upon by a difference in pressure between said first and second chambers resulting from the opening of said three-way valve, said moving partition driving a pneumatic piston which moves with respect to said casing, said moving partition carrying the three-way valve and contributing at least to transmitting said boost force, said main hydraulic piston of the master cylinder including a hollow moving cylinder receiving at least some of said boost force, a reaction piston which slides in leaktight fashion and axial direction in said hollow moving cylinder, said reaction piston receive at least the input force, said reaction piston being characterized by being integral with the plunger and delimiting within said moving cylinder a reaction chamber which communicates with an interior volume of said master cylinder through a pressure-regulating device inserted between said reaction chamber and said interior volume of the master cylinder and via which said reaction chamber communicates with said interior volume of said master cylinder.

2. The boosted braking system according to claim 1, characterized in that said pressure-regulating device introduces a constant difference between the pressure prevailing in said interior volume of said master cylinder and the pressure prevailing in said reaction chamber.

3. The boosted braking system according to claim 2, characterized in that said pressure-regulating device includes a floating piston which is urged forwards by first elastic means, said floating piston moving between a first stop and a second stop, and including a normally closed non-return valve allowing communication between said reaction chamber and said interior volume of said master cylinder and preventing communication in the other direction, said non-return valve being opened when said floating piston is shifted backwards under the effect of a pressure in said interior volume of said master cylinder exceeds a predetermined value.

4. The boosted braking system according to claim 3, characterized in that said non-return valve includes a ball valve having a ball which is urged by second elastic means towards a seat formed on said floating piston.

5. The boosted braking system according to claim 4, characterized in that said second stop includes a pip capable of lifting said ball off its seat when said floating piston is shifted towards said second stop.

6. The boosted braking system according to claim 3, characterized in that said first elastic means include a spring for urging said floating piston forwards, in a position of rest resting against said first stop.

7. The boosted braking system according to claim 3, characterized in that said first elastic means include a first spring for urging said floating piston forwards, in a position of rest resting against said first stop, and a second spring for urging said floating piston backwards, said first spring having a preload at rest which is greater than a preload of said second spring.

8. The boosted braking system according to claim 7, characterized in that said preload at rest of said second spring is adjustable.

9. The boosted braking system according to claim 8, characterized in that said second spring is arranged between said floating piston and a third stop which is formed in said moving cylinder, said third stop having an adjustable axial position.

10. The boosted braking system according to claim 9, characterized in that said third stop is threaded and screwed into a tapping made in said moving cylinder.

* * * * *